United States Patent [19]

Satoh et al.

[11] Patent Number: 5,270,885
[45] Date of Patent: Dec. 14, 1993

[54] HARD-DISK STORAGE APPARATUS WITH MEMORY STORING DATA-HEAD CONTROL INFORMATION

[75] Inventors: Hiroshi Satoh; Tetsuyuki Hishikawa; Toshio Takeuchi; Yoshiji Kitamura, all of Tokyo, Japan

[73] Assignee: NEC Corporation, Tokyo, Japan

[21] Appl. No.: 642,579

[22] Filed: Jan. 17, 1991

[30] Foreign Application Priority Data

Jan. 17, 1990 [JP] Japan ..................... 2-8809

[51] Int. Cl.⁵ .............................. G11B 5/596
[52] U.S. Cl. ................................. 360/77.04
[58] Field of Search .............. 360/77.04, 77.03

[56] References Cited
U.S. PATENT DOCUMENTS

| | | | |
|---|---|---|---|
| 4,969,059 | 11/1990 | Volz et al. | 360/77.04 |
| 5,018,095 | 5/1991 | Nissimov | 364/900 |
| 5,084,791 | 1/1992 | Thanos et al. | 360/77.04 |

Primary Examiner—David L. Robertson
Attorney, Agent, or Firm—Sughrue, Mion, Zinn, Macpeak & Seas

[57] ABSTRACT

A hard-disk storage apparatus is provided with a plurality of stacked magnetic recording disks each of which is provided with a plurality of tracks. Each of the tracks is specified by a cylinder address and a physical data-head address. Logical data-head addresses applied to the hard-disk are converted into the corresponding physical data-head address according to a conversion table pre-recorded within a non-volatile memory. Further, offset parameters of each data-head over two selected cylinders at predetermined temperatures are previously stored within the non-volatile memory. A microprocessor unit calculates offset parameters of all the data-heads over each of the tracks at a given temperature preferably measured within the hard-disk storage assembly. These offset parameters are utilized to correct the displacement of each data-head over a given track due to temperatures.

2 Claims, 10 Drawing Sheets

| MEMORY ADDRESS OF MEMORY 50 | CONTENTS OF MEMORY 50 |
|---|---|
| A0 | PHYSICAL "ID" CODE ASSIGNED TO HARD DISK ASSEMBLY 10' |
| A1 | NUMBER OF PHYSICAL DATA HEADS (= n+1) |
| A2 | NUMBER OF PHYSICAL DATA HEADS AVAILABLE |
| A3 | NUMBER OF PHYSICAL CYLINDERS |
| A4 | AMOUNT OF SHIFT OF HOME CYLINDER (= m) |
| . | |
| B0 | LOGICAL "ID" CODE ASSIGNED TO HARD DISK ASSEMBLY 10' |
| B1 | NUMBER OF LOGICAL DATA HEADS (= k) |
| B2 | NUMBER OF LOGICAL CYLINDERS |
| . | |
| C0 | ADDRESS OF PHYSICAL DATA-HEAD ASSIGNED TO LOGICAL DATA-HEAD ADDRESS #0 |
| C1 | ADDRESS OF PHYSICAL DATA-HEAD ASSIGNED TO LOGICAL DATA-HEAD ADDRESS #1 |
| . | |
| Ck | ADDRESS OF PHYSICAL DATA-HEAD ASSIGNED TO LOGICAL DATA-HEAD ADDRESS #k |

Rows A0–A4 are bracketed as 70; rows B0–B2 as 72; rows C0–Ck as 74.

FIG.3 B

| MEMORY ADDRESS OF MEMORY 50 | CONTENTS OF MEMORY 50 |
|---|---|
| D0 | OFF-TRACK PARAMETER OF PHYSICAL DATA-HEAD #0 ON OUTER REFERENCE CYLINDER AT LOW TEMPERATURE |
| D1 | OFF-TRACK PARAMETER OF PHYSICAL DATA-HEAD #1 ON OUTER REFERENCE CYLINDER AT LOW TEMPERATURE |
| . Dn | OFF-TRACK PARAMETER OF PHYSICAL DATA-HEAD #k ON OUTER REFERENCE CYLINDER AT LOW TEMPERATURE |
| E0 | OFF-TRACK PARAMETER OF PHYSICAL DATA-HEAD #0 ON INNER REFERENCE CYLINDER AT LOW TEMPERATURE |
| E1 | OFF-TRACK PARAMETER OF PHYSICAL DATA-HEAD #1 ON INNER REFERENCE CYLINDER AT LOW TEMPERATURE |
| . En | OFF-TRACK PARAMETER OF PHYSICAL DATA-HEAD #k ON INNER REFERENCE CYLINDER AT LOW TEMPERATURE |
| F0 | OFF-TRACK PARAMETER OF PHYSICAL DATA-HEAD #0 ON OUTER REFERENCE CYLINDER AT HIGH TEMPERATURE |
| F1 | OFF-TRACK PARAMETER OF PHYSICAL DATA-HEAD #1 ON OUTER REFERENCE CYLINDER AT HIGH TEMPERATURE |
| . Fn | OFF-TRACK PARAMETER OF PHYSICAL DATA-HEAD #k ON OUTER REFERENCE CYLINDER AT HIGH TEMPERATURE |
| G0 | OFF-TRACK PARAMETER OF PHYSICAL DATA-HEAD #0 ON INNER REFERENCE CYLINDER AT HIGH TEMPERATURE |
| G1 | OFF-TRACK PARAMETER OF PHYSICAL DATA-HEAD #1 ON INNER REFERENCE CYLINDER AT HIGH TEMPERATURE |
| . Gn | OFF-TRACK PARAMETER OF PHYSICAL DATA-HEAD #k ON INNER REFERENCE CYLINDER AT HIGH TEMPERATURE |

HARD-DISK STORAGE APPARATUS WITH MEMORY STORING DATA-HEAD CONTROL INFORMATION

BACKGROUND OF THE INVENTION

1. Field of the Invention

The present invention relates to a storage apparatus employing a transducer positioning system, and more specifically to a hard-disk storage apparatus in which a memory is provided for memorizing control information by which data transducers (viz., data-heads) are controlled.

2. Description of the Prior Art

Figure 1:
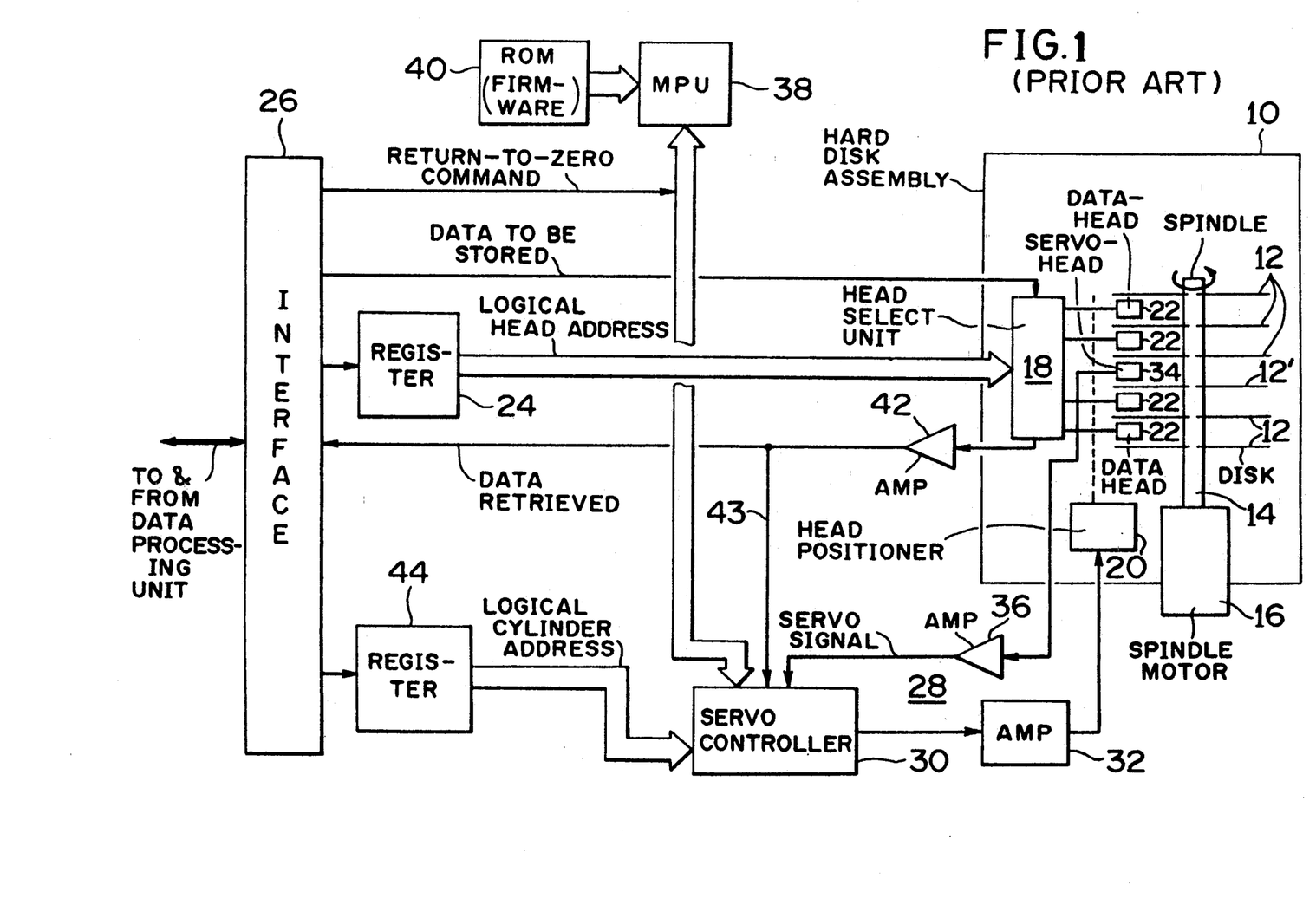
FIG. 1 is a block diagram showing a prior art arrangement of a hard-disk storage apparatus, referred to in the opening paragraphs.

Before turning to the instant invention, it is deemed advantageous to briefly discuss a known hard-disk type storage apparatus with reference to FIG. 1.

FIG. 1 shows an arrangement which comprises a hard-disk assembly 10 housed in a sealed, contamination-free container (not shown). The disk assembly 10 includes a plurality of stacked magnetic recording disks 12 and 12' supported by a center spindle 14 with a suitable space between the disks. Reference numeral 12' designates a servo disk on which a plurality of servo tracks are pre-recorded. A plurality of data-heads 22 are ganged for movement with a servo-head 34 which derives head position information from the servo tracks on the servo disk 12'. The spindle 14 is rotated in a predetermined direction by a spindle motor 16. Although not illustrated in FIG. 1, it is usual that both sides of each of the disks 12, 12' are used for data storage except for the top surface of the first disk and the bottom surface of the last in the hard-disk pack.

The hard-disk assembly 10 further includes a head select unit 18 which includes a logical data-head address decoder and a head selector (both not shown), and a head positioner 20. The head select unit 18 decodes a logical data-head address applied thereto via a register 24 and, then selects one of the data-heads 22 in response to the decoded address. The register 24 is supplied with logical data-head addresses from an external data processing unit (not shown) via an interface 26. The head positioner 20, forming part of a servo control loop 28, controls positioning of a head access assembly (not shown in detail) in response to an output of a servo controller 30 via an output amplifier 32. The head access assembly, which may be called a positionable head carrier, includes the above-mentioned data and servo-heads 22 and 34. More specifically, the head access assembly includes a plurality of arms to which the heads 22 and 34 are attached. The arms move in and out in unison among the individual disks. The output of the servo-head 34 is applied to the servo controller 30 after being amplified at an amplifier 36.

The FIG. 1 arrangement still further comprises a microprocessor unit (MPU) 38, a read-only memory (ROM) 40, an output amplifier 42 and a logical cylinder address register 44. The MPU 38 controls the servo controller 30 under control of firmware pre-stored in the ROM 40, while the register 44 is supplied with logical cylinder addresses from the external data processing unit via the interface 26. The amplifier 42 is provided for amplifying the retrieved data from a selected data-head via the head selector 18.

As previously mentioned, the registers 24, 44 are respectively supplied, via the interface 26, with logical data-head addresses and logical cylinder addresses, and hence a desired track is specified by one pair of logical data-head and logical cylinder addresses. The servo controller 30, under control of the MPU 38, receives a logical cylinder address and applies a head positioning signal to the head positioner 20. Accordingly, the servo-head 34 is able to pick up servo control information provided on the servo track of the cylinder which is defined by the logical cylinder address applied to the servo controller 30, and applies the servo information thus derived to the controller 30. The servo loop 28 includes the servo-head 34, the amplifiers 32, 36, the head positioner 20 and the controller 30, and establishes data-head positioning by feeding back the servo information to the controller 30.

In order to compensate for temperature dependant (for example) offset of each of the data-heads, the known apparatus is provided with servo signals discretely buried on each of the data tracks. The servo controller 30 derives the data track servo signals from the output of the amplifier 42 via a line 43.

In the event that the external data processing unit (not shown) detects a data retrieve malfunction, it applies a return-to-zero command to the MPU 38 via the interface 26. In response to this command, the MPU 38 instructs the servo controller 30 to position the servo-head 34 to a home cylinder in order to retry the data read operation. The home cylinder is usually an outermost cylinder of multiple data cylinders and will be referred to later in connection with the instant invention.

The aforesaid known technique has, however, encountered the problems as set forth below.

According to the above-mentioned prior art, the logical data-head addresses applied from the external data processing unit, are fixedly assigned to the physical data-heads on a one-to-one basis during the design stage. Accordingly, in the event that one or more physical data-heads are found unavailable at a product inspection during a final stage of manufacturing, the hard-disk system is subject to rejection. More specifically, even if the known hard disk apparatus is provided with data-heads the number of which is greater than the number of logical data-heads required, it is practically impossible to rearrange a predetermined correspondence between logical and physical data-head addresses with individual hard-disk apparatus in the case that one or more data-heads are found unavailable.

Further, according to the above-mentioned prior art, the data read/write operation requires that every data track access include the following steps: (a) deriving servo signals discretely pre-recorded on a data track to be accessed and (b) performing the head position compensation through the servo controller 30 based on the data track servo signals derived. Each time the data track is accessed, the above steps are repeated. As a result the access time according to the prior art is rendered undesirably slow.

Still further, when the return-to-zero command issues in response to a data read failure, the aforesaid prior art only retries the initial seek and moves an associated data-head to the home cylinder for calibration. However, if the issuance of such a command stems from complete off-track or partial track misalignment due to a large ambient temperature change (for example), the data retrieve failure might occur repeatedly in the subsequent retrials until the ambient temperature falls within a suitable range.

SUMMARY OF THE INVENTION

It is an object of the present invention to provide a hard-disk storage apparatus which is equipped with a memory in which control information for data-heads is stored in connection with individual storage apparatus.

Another object of the present invention is to provide a hard-disk storage apparatus wherein assignment of physical heads to logical head addresses is variable with individual storage apparatus.

Another object of the present invention is to provide a hard-disk storage apparatus which does not require a servo signal on the data tracks.

Another object of the present invention is to provide a hard-disk storage apparatus in which an offset parameter of each of the data tracks is renewed when either of the temperatures within a hard-disk assembly, or the temperature outside of the same changes by a predetermined value.

In brief, the above object is achieved by a hard-disk storage apparatus is provided with a plurality of stacked magnetic recording disks each of which is provided with a plurality of tracks. Each of the tracks is specified by a cylinder address and a physical data-head address. Logical data-head addresses applied to the hard-disk are converted into the corresponding physical data-head address according to a conversion table prerecorded within a non-volatile memory. Further, offset parameters of each data-head over two selected cylinders at predetermined temperatures are previously stored within the non-volatile memory. A microprocessor unit calculates offset parameters of all the data-heads over each of the tracks at a given temperature preferably measured within the hard-disk storage assembly. These offset parameters are utilized to correct the displacement of each data-head over a given track due to temperatures.

More specifically a first aspect of the present invention comes in a hard-disk storage apparatus, comprising: a plurality of stacked magnetic recording disks each of which is provided with a plurality of tracks, each of the tracks being specified by a cylinder address and a physical data-head address; a head selector; a positionable head carrier; a plurality of data-heads each of which is mounted on the positionable head carrier and which is selectively positionable over tracks of a disk assigned thereto; a servo-head, the servo-head being mounted on the positionable head carrier and being selectively positionable over servo tracks of a disk assigned thereto; a servo controller, the servo controller being coupled to the servo-head and the positionable head carrier, the servo controller being supplied with an output of the servo-head and controlling the positionable head carrier; a first memory, the first memory previously storing address conversion data indicating a correspondence between a physical data-head address and a logical data-head address to be applied to the hard disk storage apparatus from an external data processing unit; a microprocessor unit, the microprocessor being coupled to the first memory and the servo controller; and an address converter, the address converter being coupled to the microprocessor unit and receiving the address conversion data under control of the microprocessor, the address converter implementing an operation wherein a physical data-head address is specified in terms of a logical data-head address applied thereto from the external data processing unit.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

A preferred embodiment of the present invention will be discussed with reference to FIGS. 2 to 9.

Figure 2:
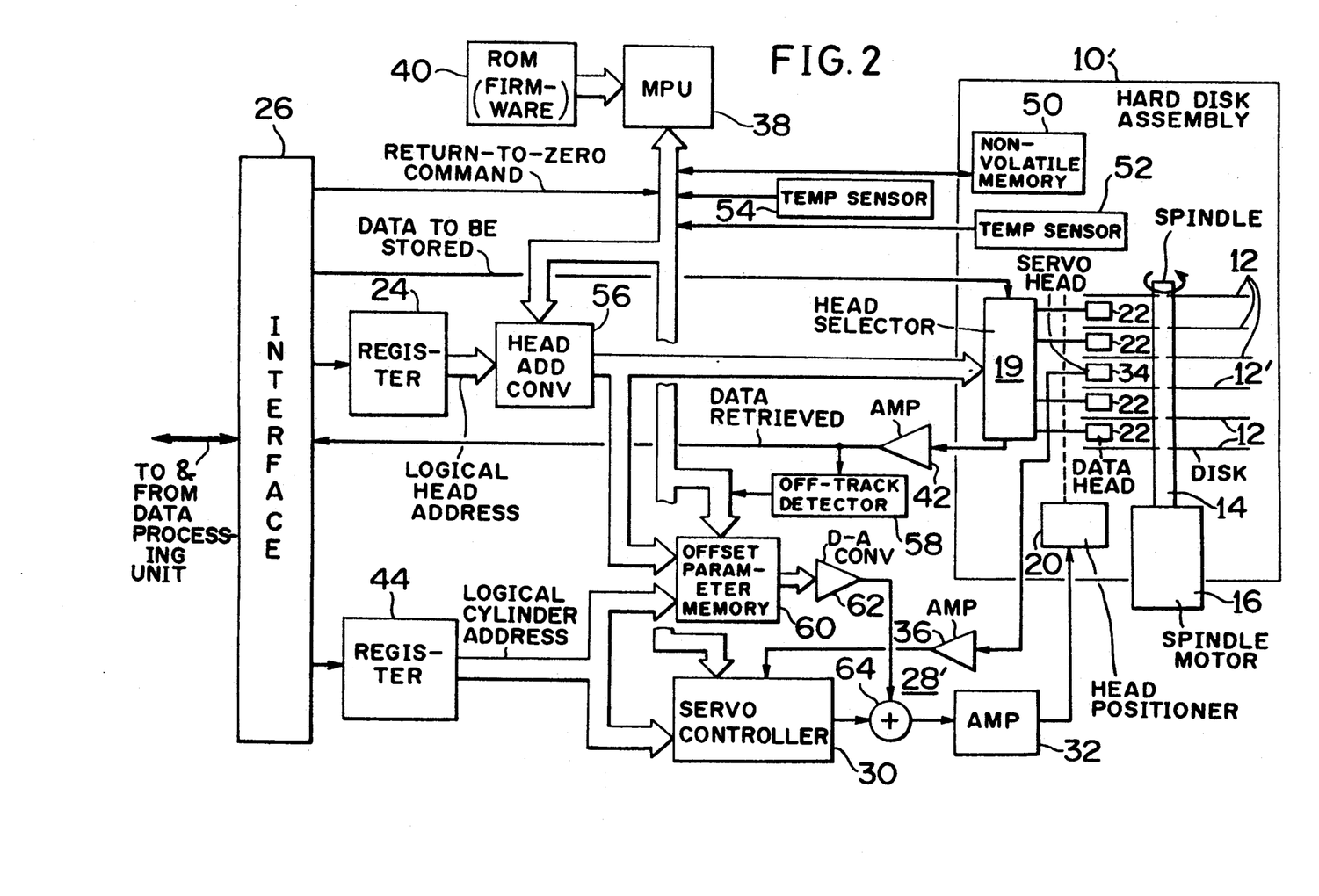
FIG. 2 is a block diagram showing a preferred embodiment of the present invention.

FIG. 2 shows the preferred embodiment in schematic block diagram form. The arrangement of FIG. 2 differs from that shown in FIG. 1 in that the former arrangement further includes a non-volatile memory 50, two temperature sensors 52, 54, a head address converter 56, an off-track detector 58, an offset parameter memory 60, a digital-to-analog converter 62 and an adder 64. A head selector 19 in FIG. 2 differs from the head select unit 18 (FIG. 1) in that the selector 19 does not include the logical data-head address decoder as in the unit 18. The temperature sensor 52 detects a temperature within the hard-disk assembly 10', while the temperature sensor 54 a temperature outside the assembly 10'. It should be noted that the hard-disk assembly shown in FIG. 2 is denoted by reference numeral 10' rather than 10 in that it further includes the above-mentioned blocks 50 and 52.

Figure 3:
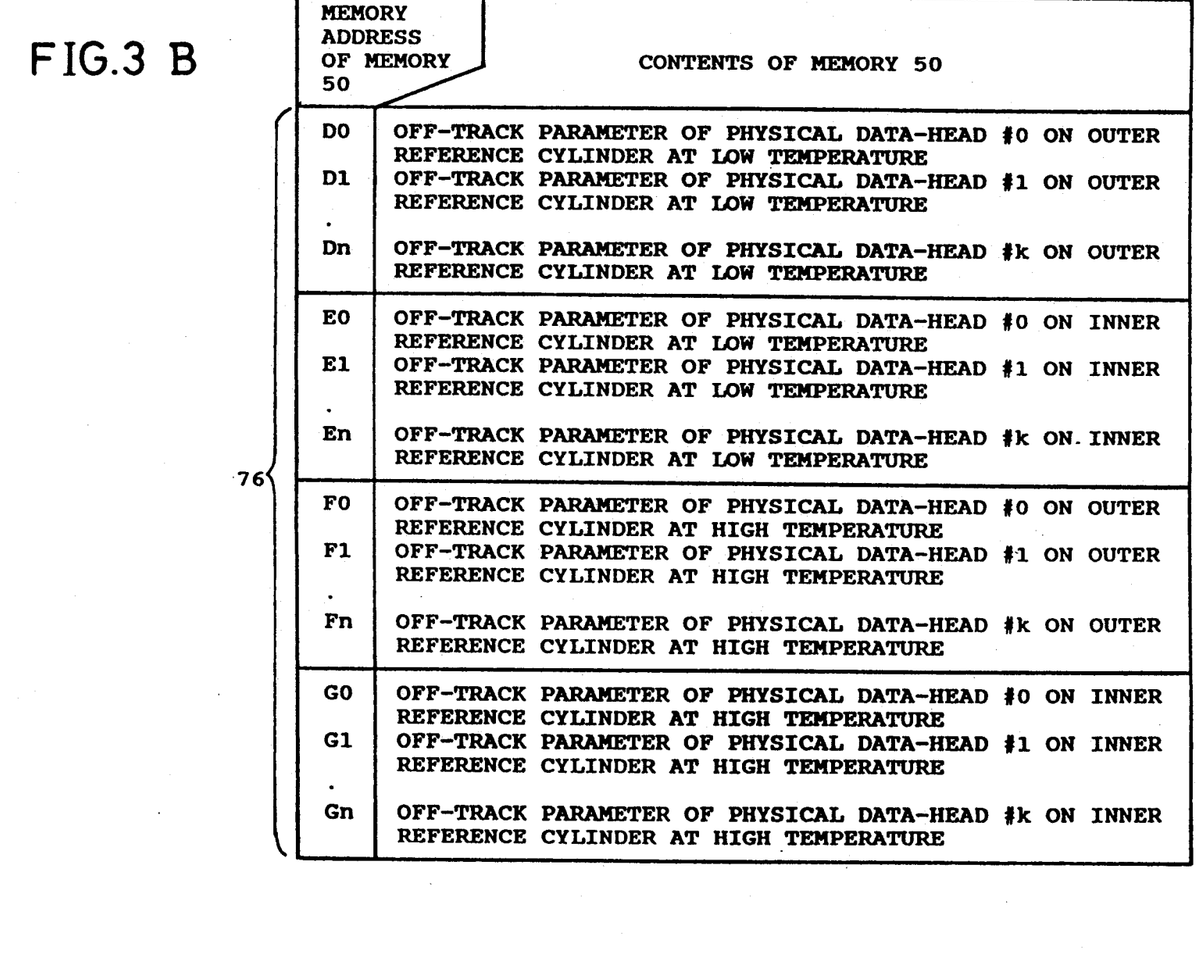
FIG. 3A is a table listing data for converting logical data-head addresses into the corresponding physical data-heads.
FIG. 3B is a table listing off-track parameters of each of physical data-heads on outer and inner reference cylinders at low and high temperatures within the hard-disk assembly.
Figure 3A:
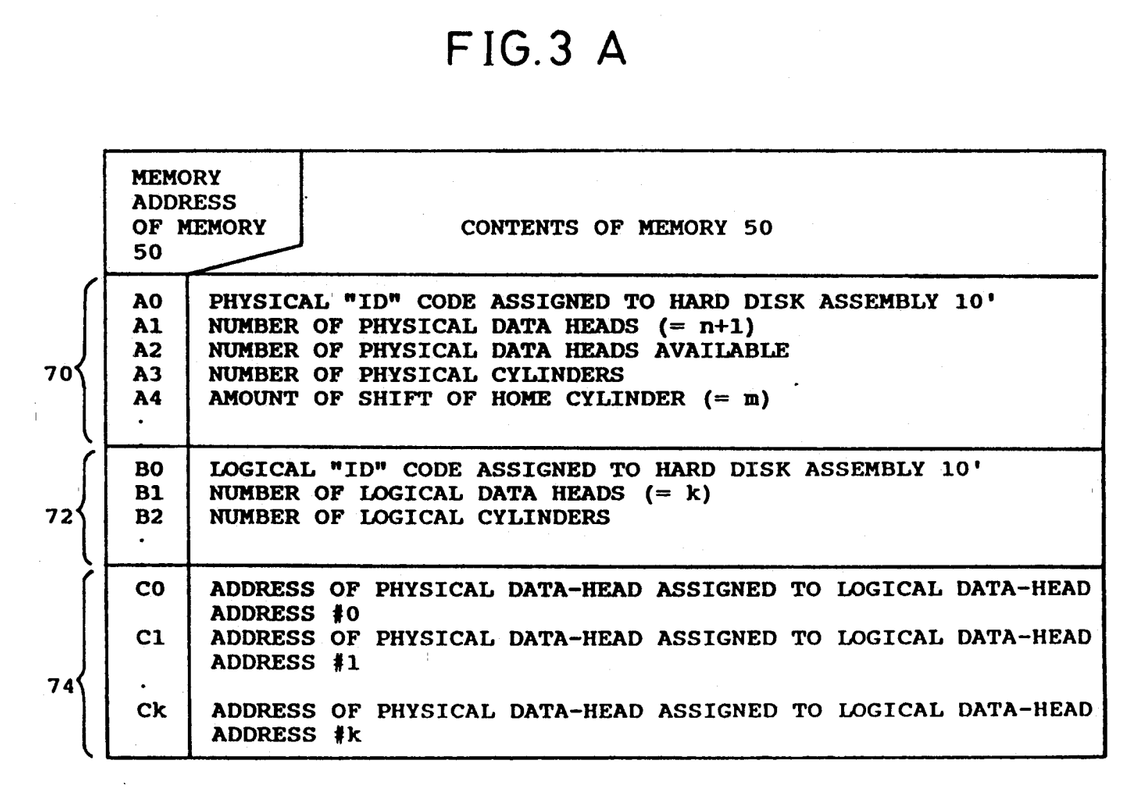

FIGS. 3A and 3B are tables which show various data pre-stored in the non-volatile memory 50 before the hard-disk assembly 10' is installed in a data processing system or when the operation of the apparatus is checked at a final operation inspection during manufacturing.

As shown in FIG. 3A, information group 70 includes various data which are stored at addresses A0 through A4. Data at address A2 indicates the number of physical data-heads available. It should be noted that the number of physical data-heads available should be equal to or more than the number of logical data-head addresses which are actually applied to the hard disk storage apparatus shown in FIG. 2. Data at address A4 is the amount of shift of a home cylinder which will be referred to later. The other data at addresses A0 and A3 can easily be understood and hence it is deemed unnecessary to further describe the same.

Information group 72 includes: (a) logical identification (ID) code assigned to the hard-disk assembly 10', (b) the number of logical data-heads and (c) the number of logical cylinders, which are respectively stored at addresses B0, B1 and B2.

Information group 74 is an address conversion table (addresses C0-Ck) for converting logical data-head addresses into the corresponding physical ones. It is practical to manufacture or prepare a hard-disk apparatus so that the number of data-heads is greater than the number of logical data-heads. Accordingly, in the event that one data-head (for example) is found unavailable at the final product inspection (for example), one of the extra data-heads can be assigned to one logical data-head address in place of the physical data-head which has been determined to be unavailable.

FIG. 3B shows information group 76 which includes various off-track parameters of each of the physical data-heads at outer and inner reference tracks at low and high temperatures (5° C. and 45° C. respectively merely by way of example) at addresses D0-Dn, E0-En, F0-Fn and G0-Gn. The outer and inner reference tracks will be described later in detail. The above-mentioned temperature is sensed by the temperature sensor 52 provided within the hard-disk assembly 10'. However, if only the sensor 52 is not sufficient for precisely measuring the temperature of the disks 12, 12' and the head arms (not shown), the output of the temperature sensor 54 may be used for more accurately detecting the temperatures of the members within the assembly 10'.

The off-track parameter of each of the physical data-heads #0-#n on an outer reference cylinder at low temperature (5° C. for example) are respectively stored at addresses D0-Dn, while the off-track parameter of each of the physical data-heads #0-#n on an inner reference cylinder at low temperature (5° C. for example) are respectively stored at addresses E0 to En. On the other hand, the off-track parameter of each of the physical data-heads #0-#n on an outer reference cylinder at high temperature (45° C. for example) are respectively stored at addresses D0 to Dn. Similarly, the off-track parameter of each of the physical data-heads #0-#n on an inner reference cylinder at high temperature (45° C. for example) are respectively stored at addresses D0 to Dn.

The outer and inner reference tracks are provided outside of a data track region on each data disk as referred to later. The MPU 38 is able to obtain an off-track value of a given data track on the basis of the data listed in group 76. For example, if the off-track value of each data track changes linearly in terms of the track position and temperature, it is easy to determine the offset of a given data track at a given temperature between the above-mentioned low and high temperatures relative to the center of the given data track.

Figure 4:
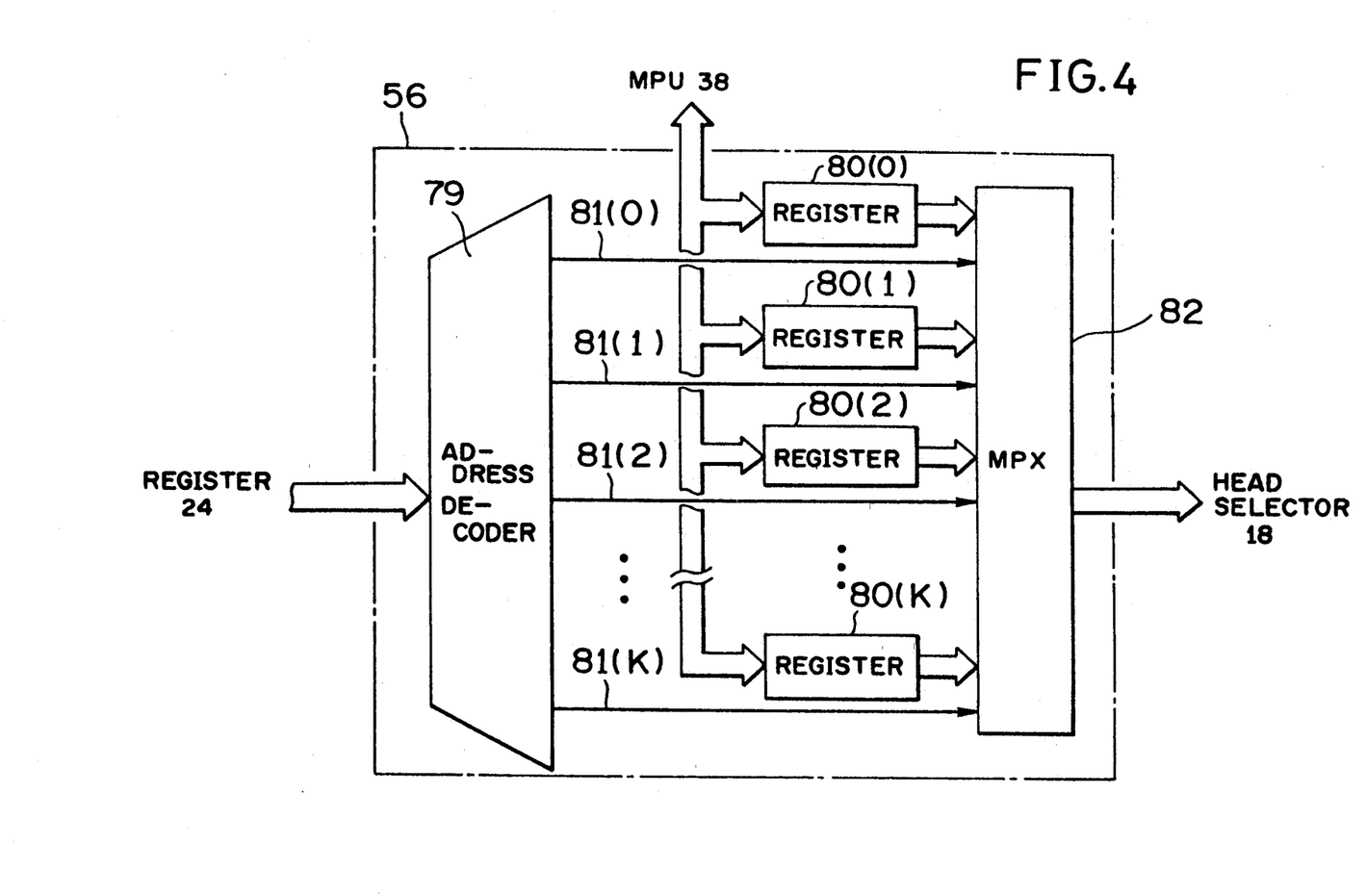
FIG. 4 is a block diagram showing an arrangement of one block included in the FIG. 2 arrangement.

FIG. 4 is a block diagram showing in detail the arrangement of the head address converter 56 of FIG. 1. The FIG. 4 arrangement includes, an address decoder 80, a plurality of registers 80(O)-80(k) and a multiplexer 82. The number of the registers 80(O)-80(k) is equal to the number of the logical data-heads stored in address B1. It goes without saying that the number of the physical data-head available stored at address A2 is equal to or more than the number of the logical data-heads (viz., "k" stored at address B1). The registers 80(O)-80(k) are respectively supplied with physical data-head addresses at the memory addresses C0-Ck. The address decoder 79 decodes a logical head address applied thereto and activates one of lines 81(O)-81(k), which is specified by the decoded address. Thus, the multiplexer 82 is allowed to supply the head selector 18 with the physical data-head address corresponding to the decoded logical data-head address.

Figure 5:
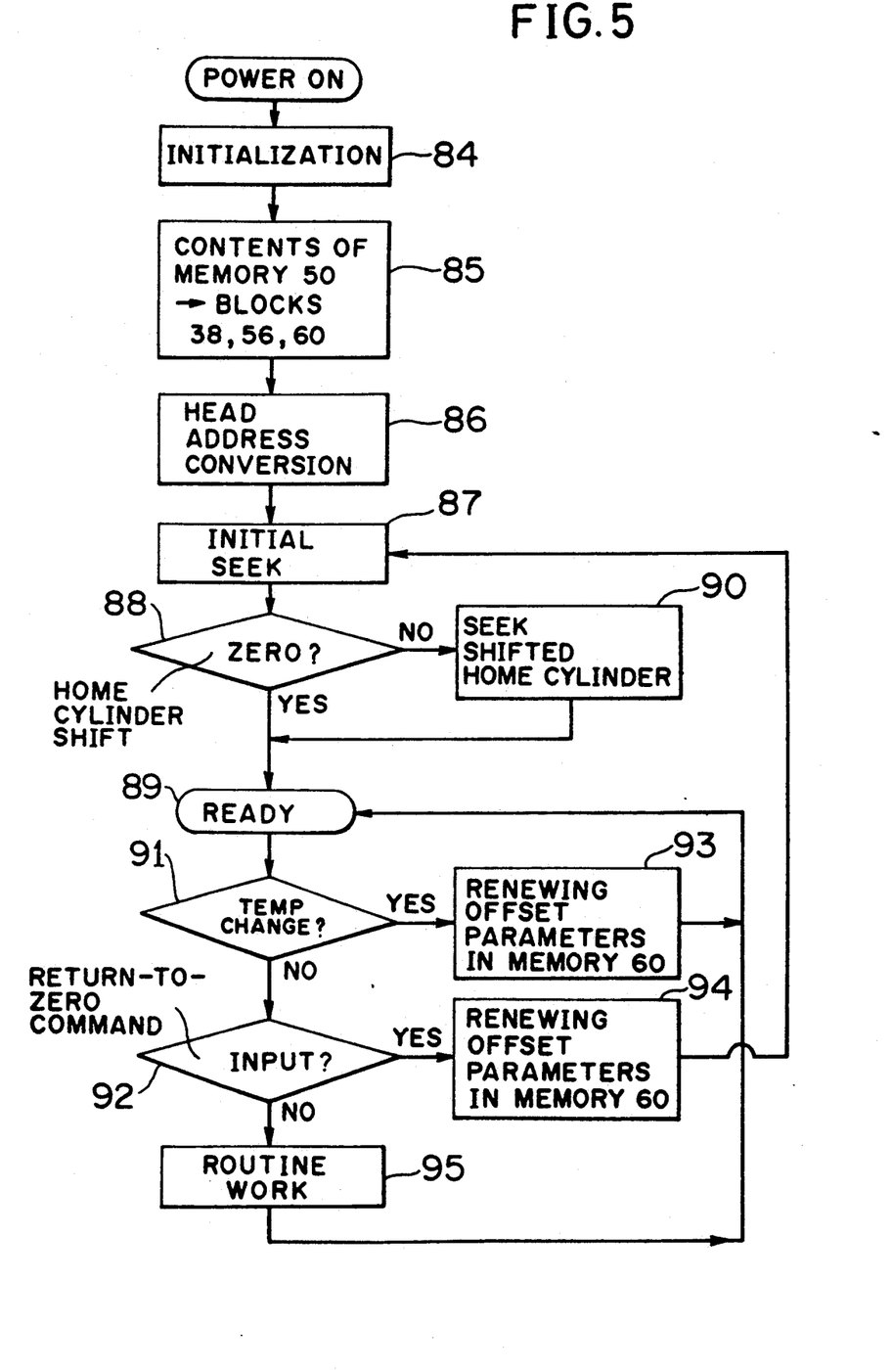
FIG. 5 is a flowchart for describing the operations of the present invention.

FIG. 5 is a flowchart showing a series of operations of the preferred embodiment for a better understanding thereof. When the hard-disk apparatus shown in FIG. 1 is powered on, a usual initialization is implemented (step 84). Subsequently, the contents of the non-volatile memory 50 is transferred to an inner memory (not shown in FIG. 2) of the MPU 38, after which the MPU 38 copies the contents of the inner memory to the head address converter 56 and the offset parameter memory 60 (step 85). Following this, the head address conversion is carried out at the converter 56 (step 86). The operations at steps 85, 86 have been described above. The remaining steps 87-95 will be referred to later.

Figure 6:
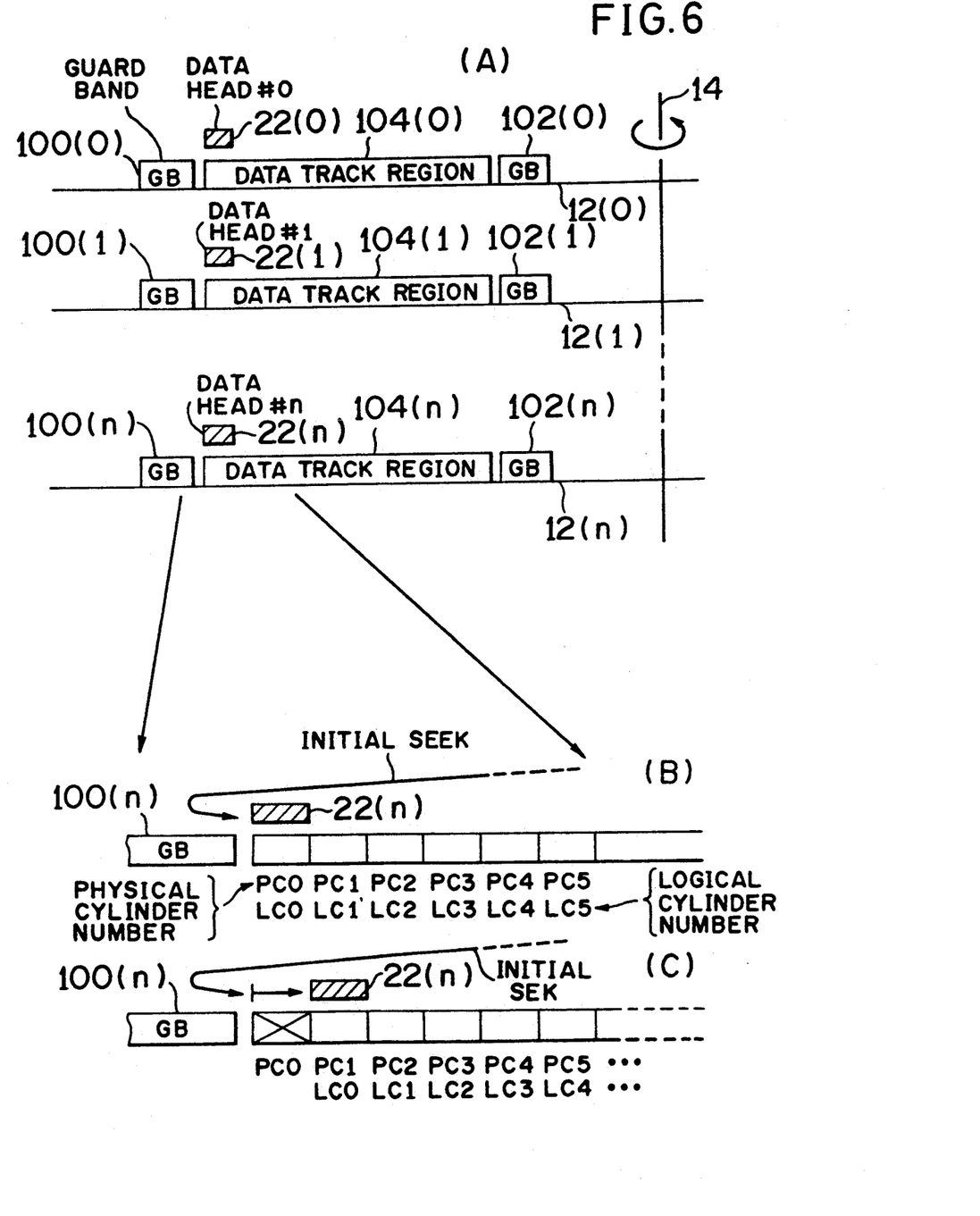
FIG. 6 is a sketch for describing for a home cylinder shift according to the present invention.

A home cylinder shift operation according to the present invention will be discussed with reference to FIG. 6. Portion (A) of FIG. 6 schematically illustrates disks 12(0), 12(1), ..., 12(n) which are supported by the spindle 14 and are respectively arranged to be accessible by corresponding data-heads 22(0), 22(1), ..., 22(n). The data head 22(0)-22(n) are also denoted by #0-#n, respectively merely for the convenience of description. It should be noted that the disks 12(0)-12(n) and the heads 22(0)-22(n) in the portion (A) of FIG. 6 correspond to those provided within the hard-disk assembly 10' (FIG. 2). The disk 12(0) has outer and inner guard bands (GBs) 100(0) and 102(0) at the opposite outside of a data track region 104(0). The guard band GB is a protector area and hence is unavailable for data read/write operation. Similarly, the disk 12(1) is provided with outer and guard bands GB 100(1), 102(1) at the opposite outside of a data track region 104(1), while the disk 12(n) has outer and guard bands GB 100(n), 102(n) at the opposite outside of a data track region 104(n).

Each of portions (B) and (C) of FIG. 6 is an enlarged illustration of parts of the guard band 100(n) and the data track region 104(n), wherein PC0-PC5 each denotes a physical cylinder number while LC0-LC5 each represents a logical cylinder number. When an initial seek is performed (step 87 (FIG. 5)), the MPU 38 checks to see if the information at address A4 of the group 72 is zero at step 88. In other words, the MPU 38 checks to see if m=0. In the event that the amount of shift of the home cylinder (viz., PCO) is zero (m=0) as shown in portion (B) of FIG. 6, the head positioner 20 (FIG. 2) allows the data-heads 22 to remain thereover (viz., ready state (step 89)) until a read/write operation is instructed. On the contrary, if the physical cylinder PC0 is unavailable and the adjacent physical cylinder PC1 is available as shown in portion (C) of FIG. 6 (viz., m=1), the MPU 38 instructs the servo controller 30 to seek the physical cylinder PC1 as a new home cylinder. Thereafter, the data-heads 22 remains on the physical cylinder PC1. In this case, the logical cylinder numbers are incremented by 1 (=m) as shown in portion (C) of FIG. 6. If the value of "m" is greater than 2, it means that (m+1) physical cylinders are continuously unavailable beginning from the physical cylinder PC0.

Figure 7:
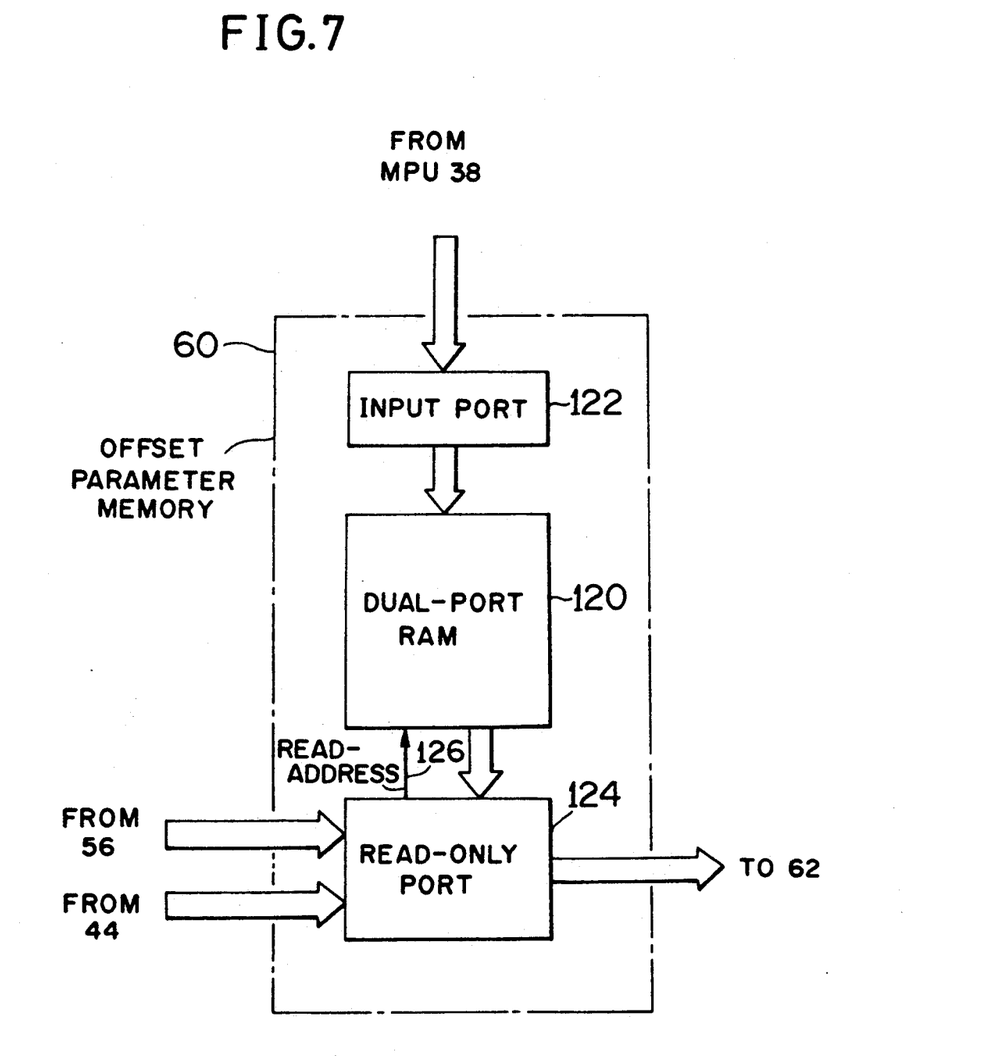
FIG. 7 is a block diagram showing an arrangement of one block included in the FIG. 2 arrangement.

Referring to FIG. 7, there is shown in block diagram form an arrangement of the offset parameter memory 60

(FIG. 2) which includes a dual-port RAM (Random Access Memory) 120, an input port 122 and a read-only port 124.

As mentioned previously, the MPU 38 is able to obtain or estimate temperature depending offset values of all the data tracks on the basis of the data listed in group 76 shown in FIG. 3B. The MPU 38 receives a signal indicating a temperature inside the hard-disk assembly 10' from the temperature sensor 52, and also receives a signal indicative of a temperature outside the assembly 10'. Thereafter, the MPU 38 estimates the above-mentioned offset values. These data are written into the dual-port RAM 120 by way of the input port 122. The data of a given track, which has been memorized in the RAM 120, is retrieved with reference to a read-address applied to the RAM 120 via an address line 126. The read-address is a combination of a physical data-head address from the converter 56 and a cylinder address from the register 44. The retrieved offset data is applied to the a-d converter 62 via the read-only port 124, and then is applied to the adder 64. This means that each of the servo signals outputted from the servo controller 30 can be corrected by the corresponding temperature depending correction signal. It is understood that according to the present invention, the servo signals discretely buried on each data track as in the prior art are no longer necessary.

Figure 8A:
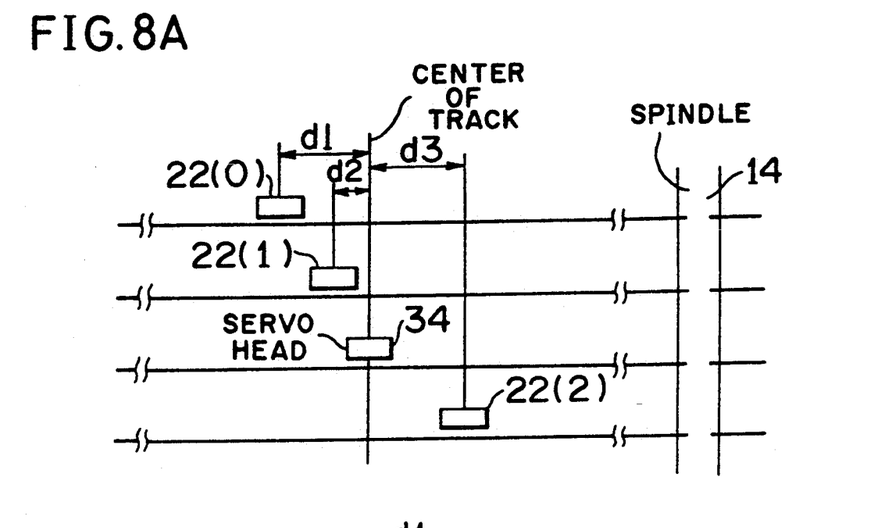
FIGS. 8A–8C each is a sketch for describing the operations of the present invention.
Figure 8B:
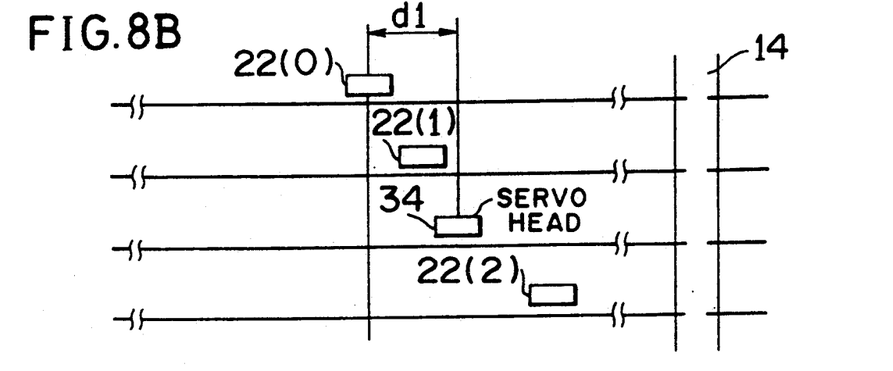
Figure 8C:
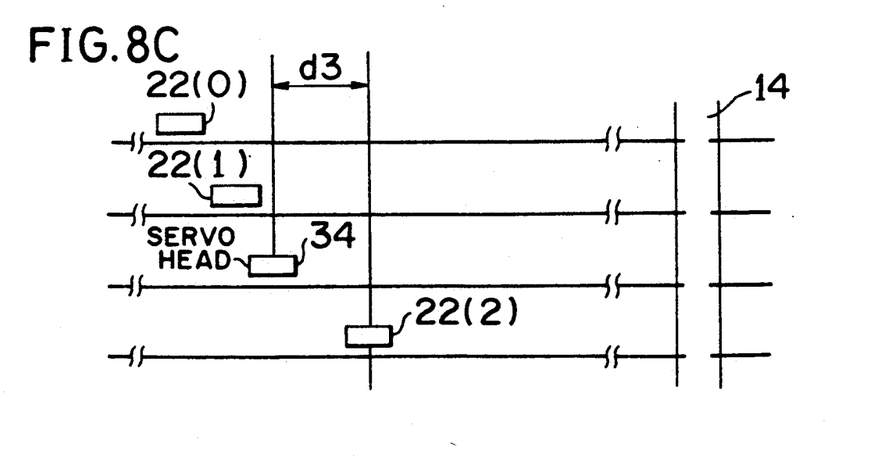

The operation of the data-head positioning correction, using the offset data within the memory 60, will be described with reference to FIGS. 8A-8C. The servo controller 30 derives the servo information from the servo head 34 and then positions centrally the servo head 34 on a given track. It is assumed that when the servo head is on-track (FIG. 8A), the data heads 22(0), 22(1) and 22(2) are deviated in position from the center of the given track due to ambient temperature as shown in FIG. 8A. The displacements of the data heads 22(0), 22(1) and 22(2) from the center of the track are assumed to be d1, d2 and d3, respectively. When the data head 22(0) is selected for read/write operation therethrough, the offset data of the data head 22(0) is derived from the memory 60 and applied to the adder 64 after being converted into the corresponding analog signal. Thus, the displacement d1 is corrected and hence the data head 22(0) is centrally positioned on the track in question (FIG. 8B). Similarly, when the data head 22(2) is selected for read/write operation therethrough, the displacement d3 is corrected as shown in FIG. 8C.

When temperature changes are sensed through the temperature sensors 52, 54 by the MPU 38, then the correction data stored in the offset parameter memory 60 are renewed under control of the MPU 38 (steps 91 and 93 (FIG. 5)). Subsequently, the flow goes to step 89 as shown in FIG. 5.

Figure 9:
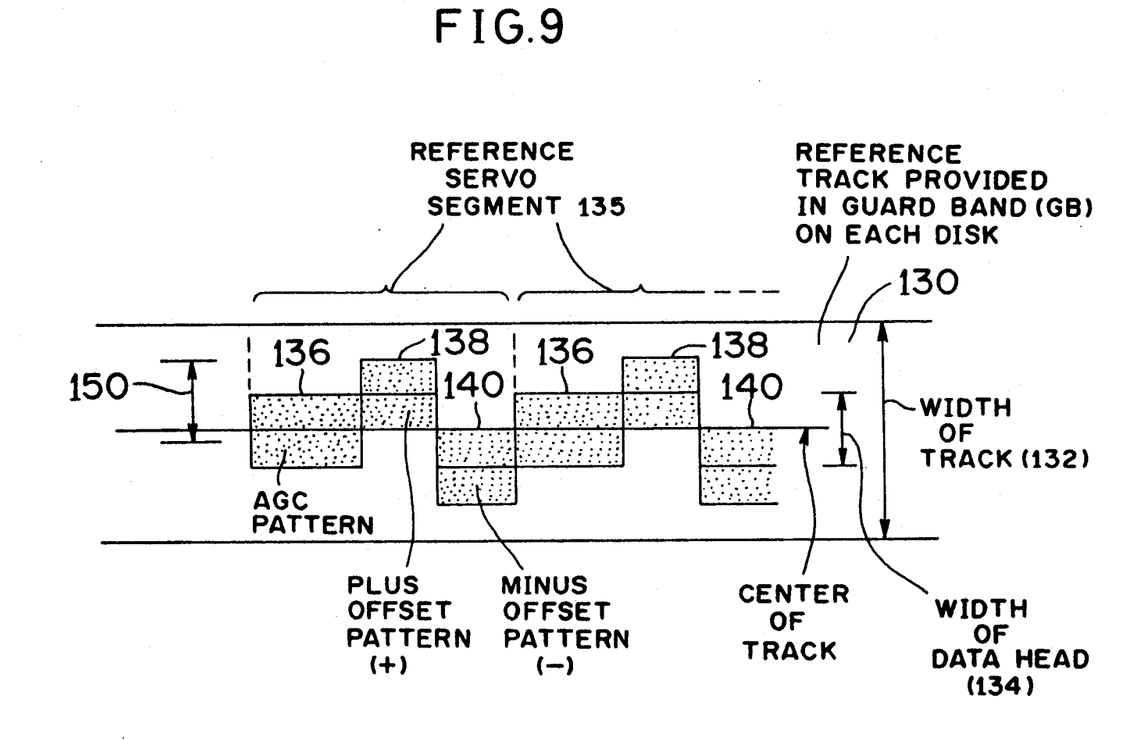
FIG. 9 is a sketch for describing the operation of the present invention.

FIG. 9 schematically illustrates a reference track 130 which is provided within each of the outer and inner guard bands on each data track (cf. FIG. 6). The reference track is used or accessed when the return-to-zero command is applied to the MPU 38. Reference numeral 132 denotes a width of the reference track 130 while reference numeral 134 a width of a data head (not shown). Each of reference servo segments 135 includes an AGC (automatic gain control) pattern 136, a plus offset pattern 138 and a minus offset pattern 140. The AGC pattern 136 is provided in alignment with the center of track 130. On the other hand, the offset patterns 138 and 140 are positioned at both sides of the center of the reference track 130 as illustrated.

In the event that the return-to-zero command is applied to the MPU 38 via the interface 26 in response to a failure of data retrieve, the servo controller 30 allows, under control of the MPU 38, all the data-heads 22 to seek the corresponding reference tracks provided in the outer and inner guard bands. Merely by way of example, the data-head 22(0) moves over the reference track 130 along with a band indicated by reference numeral 150. In this case, an amplitude of a pulse signal derived at the plus offset pattern 138 is larger than that at the minus offset pattern 140. The MPU 38 determines the offset value on the basis of the amplitude difference between the signals obtained from the offset patterns 138 and 140. The pulse signal derived at the AGC pattern 136 is utilized to control amplification of the signals obtained at the reference track 130. The above-mentioned operation is carried out in connection with all the remaining data-heads.

Thereafter, the MPU 38 updates the offset parameters stored in the offset parameter memory 60 on the basis of the following data: (a) offset data derived by the above-mentioned reference track search, (b) data stored in group 76 in the non-volatile memory 50 and (c) temperature data applied from the temperature sensors 52 and 54.

Returning to FIG. 5, the MPU 38 checks to see if the return-to-zero command is generated at step 92. If the command issues, then the renewing operation is implemented at step 94 and then the flow returns to step 87 for awaiting the next read/write operation. Otherwise, a routine work is performed at step 95 and thereafter the flow returns to step 89.

The various operations thus far discussed can be classified into four groups in connection with operation steps shown in FIG. 5. That is to say, (a) the head address conversion (step 86), (b) the home cylinder shift operation (steps 87, 88 and 90), (c) the offset parameter renewing in response to the ambient temperature change exceeding the predetermined value and (d) the offset parameter renewing when the return-to-zero command is generated. The preferred embodiment may include all the above-mentioned operations (a)-(d). However, the operations thus classified may be utilized independently with each other. Accordingly, it is within the scope of the present invention to include one of the above described operations.

While the foregoing description described various operations according to the present invention, the various alternatives and modifications possible without departing from the scope of the present invention, which is limited only by the appended claims, will be apparent to those skilled in the art.

What is claimed is:
1. A hard-disk storage apparatus, comprising:
a plurality of stacked magnetic recording disks each of which is provided with a plurality of tracks, each of said tracks being specified by a cylinder address and a physical data-head address;
a head selector;
a positionable head carrier;
a plurality of data-heads each of which is mounted on said positionable head carrier and which is selectively positionable over tracks of a disk assigned thereto;
a servo-head, said servo-head being mounted on said positionable head carrier and being selectively positionable over servo tracks of a disk assigned thereto;

a servo controller, said servo controller being coupled to said servo-head and said positionable head carrier, said servo controller being supplied with an output of said servo-head and controlling said positionable head carrier;

a first memory, said first memory previously storing address conversion data indicating a correspondence between a physical data-head address and a logical data-head address to be applied to said hard disk storage apparatus from an external data processing unit, said memory further storing first off-track parameter of each of physical data-heads on two predetermined reference cylinders at first and second predetermined temperatures both measured within said hard-disk storage apparatus;

a microprocessor unit, said microprocessor being coupled to said first memory and said servo controller, said microprocessor unit obtaining second off-track parameters each of which indicates an off-track value of a given data-head over each of the cylinders at a given temperature between said first and second temperatures;

an address converter, said address converter being coupled to said microprocessor unit and receiving said address conversion data under control of said microprocessor, said address converter implementing an operation wherein a physical data head address is specified in terms of a logical data-head address applied thereto from said external data processing unit;

a second memory, said second memory storing the second off-track parameters under control of said microprocessor unit, said second memory generating one of the second off-track parameters in response to said cylinder address and said physical data-head address applied thereto; and an adder, said adder being provided between said servo controller and said positionable head carrier, said adder implementing addition of said second parameter and the output of said servo controller and applying an output thereof to said positionable head carrier.

2. A hard-disk storage apparatus as claimed in claim 1, wherein said second offtrack parameters are updated in the event that said given temperature change by a predetermined value.

* * * * *